(12) United States Patent
Wang et al.

(10) Patent No.: US 11,845,679 B2
(45) Date of Patent: Dec. 19, 2023

(54) COPPER INTEGRATED ELECTRODE WITH CONVERTIBLE OXIDATION STATE AND PREPARATION METHOD AND APPLICATION METHOD THEREOF

(71) Applicant: Tongji University, Shanghai (CN)

(72) Inventors: Ying Wang, Shanghai (CN); Fengting Li, Shanghai (CN); Tao Feng, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 381 days.

(21) Appl. No.: 17/095,746

(22) Filed: Nov. 12, 2020

(65) Prior Publication Data

US 2022/0033285 A1    Feb. 3, 2022

(30) Foreign Application Priority Data

Jul. 31, 2020  (CN) .......................... 202010759995.5

(51) Int. Cl.
| | |
|---|---|
| *C02F 1/461* | (2023.01) |
| *C25B 11/069* | (2021.01) |
| *C02F 1/467* | (2023.01) |
| *C25B 11/02* | (2021.01) |
| *C02F 101/16* | (2006.01) |

(52) U.S. Cl.
CPC ........ *C02F 1/46109* (2013.01); *C02F 1/4676* (2013.01); *C25B 11/02* (2013.01); *C25B 11/069* (2021.01); *C02F 2001/46142* (2013.01); *C02F 2101/163* (2013.01)

(58) Field of Classification Search
CPC ...................... C02F 1/461–2001/46171; C25B 11/04–11/097
See application file for complete search history.

(56) References Cited

PUBLICATIONS

Wang et al. ("Unveiling the Activity Origin of a Copper-based Electrocatalyst for Selective Nitrate Reduction to Ammonia", Angew. Chem. Int. Ed. 2020, 59, pp. 5350-5354) (Year: 2020).*

(Continued)

*Primary Examiner* — Alexander W Keeling
(74) *Attorney, Agent, or Firm* — Bayramoglu Law Offices LLC

(57) ABSTRACT

A copper integrated electrode with a convertible oxidation state, a preparation method and an application method are provided. The preparation process is based on an electrochemically induced self-growth method. Copper foam is used as a precursor, soaked in a graphene oxide solution, dried, calcined at high temperature and annealed, and then treated with an alkali solution to obtain the copper integrated electrode with the convertible oxidation state. The working electrode prepared by the nano-catalytic material of the present invention has good denitrification performance in the environmental field, which can achieve nearly 100% nitrate removal rate, nearly 100% nitrogen selectivity and long-term stability. These properties are due to the prepared working electrode having an oxidizable copper (I, II/0, I), oxygen vacancy (O) and a one-dimensional nanowire structure. The structure can regulate the adsorption and reduction of intermediate products, resulting in nearly 100% nitrate removal rate and nearly 100% nitrogen selectivity.

3 Claims, 4 Drawing Sheets

(56) References Cited

PUBLICATIONS

Wang et al. ("A three-dimensional Cu nanobelt cathode for highly efficient electrocatalytic nitrate reduction", Nanoscale, 2020, 12, pp. 9385-9939, referred to as Zhu herein) (Year: 2020).*

Li et al. ("Efficient electrochemical reduction of nitrate to nitrogen using Ti/IrO2—Pt anode and different cathodes", Electrochimica Acta, 54, 2009, pp. 4600-4606) (Year: 2009).*

* cited by examiner

COPPER INTEGRATED ELECTRODE WITH CONVERTIBLE OXIDATION STATE AND PREPARATION METHOD AND APPLICATION METHOD THEREOF

CROSS REFERENCE TO THE RELATED APPLICATIONS

This application is based upon and claims priority to Chinese Patent Application No. 202010759995.5, filed on Jul. 31, 2020, the entire contents of which are incorporated herein by reference.

TECHNICAL FIELD

The present invention belongs to the technical field of environmental water pollution control, and in particular relates to a copper integrated electrode with a convertible oxidation state and its preparation method, and an application of the electrode in denitrification of a water body containing nitrate.

BACKGROUND

The continuous growth of chemical fertilizers and fossil fuels has led to $NO_3^-$ pollution in drinking water worldwide. Nitrates also cause algal blooms in lakes, rivers and oceans. The remediation of $NO_3^-$ pollution is one of the most challenging problems in pollution control and environmental protection due to the infinite solubility and high stability of $NO_3^-$ in water. Among many denitrification technologies, electrocatalytic denitrification technology is a green and efficient technology. Due to the rapid development of efficient nanocatalysis and renewable energy, it is becoming more cost competitive.

Electrocatalytic denitrification can significantly simplify operation and maintenance procedures relating to remediation. Most notably, there is no need to add treatment chemicals, such as oxidants, reductants and coagulants. With the rapid development of nanotechnology and nanomaterials, numerous promising breakthroughs having application for wastewater denitrification have occurred in electrocatalysis. A key challenge of electrocatalytic denitrification is how to ensure the complex 5-electron transfer reaction (5-ETR) from $NO_3^-$ to $N_2$ using the 5-ETR to convert harmful $NO_3^-$ into non-toxic and harmless nitrogen, $N_2$. Such conversion is desirable because it is beneficial in engineering applications for treating $NO_3^-$ polluted wastewater. Single metal electrode and the application of electrocatlysis technology in the denitrification of a water body containing nitrates, however, have never been reported to achieve nearly 100% of 5-ETR complex molecular pathway electrocatalytic denitrification.

In general, the bimetallic combination of noble metals (such as Pd, Pt, Rh) and transition metals (such as Cu, Ni, Sn) is a preferred electrocatalyst for $NO_3^-$ reduction in water. It is well known that Pd can be activated by hydrogen, while Cu promotes the catalytic activity of Pd by increasing d-band vacancies and compressive strain effect. However, the expense and rapid deactivation in water of noble metals, and the generation of $NO_4^+$, $NO_2$ and other toxic by-products restrict the large-scale environmental application of bimetallic electrocatalysts. In order to overcome these shortcomings, many studies focus on the use of reductants such as zero-valent iron to achieve this process. However, strong reductants are prone to causing 8-electron transfer reaction, resulting in a significant decrease in the selectivity of $N_2$.

Therefore, it is a challenging task to design a new type of single metal electrode based on the electrocatalytic denitrification technology to achieve nearly 100% of the 5-ETR complex molecular pathway electrocatalytic denitrification technology, so as to achieve the purpose of efficient removal of nitrate pollution in water.

SUMMARY

In view of the above-mentioned shortcomings, the present invention provides a preparation method of a copper integrated electrode with a convertible oxidation state, an electrode prepared by the preparation method and an application method of the electrode in denitrification of a water body containing nitrate. The copper integrated electrode with the convertible oxidation state, which is prepared by the preparation method of the present invention, uses non-noble metal Cu. Therefore, the preparation of the electrode requires neither noble metals nor pretreatment. The raw material required is inexpensive and easy to obtain, and the preparation method has simple operations. The prepared copper integrated electrode can be directly used. In the application, the multi-electron transfer of nitrate reduction in a water body is controlled by adjusting the content and morphology of $Cu_2O$ on the integrated electrode, and the nitrate in the water body is reduced into nitrogen with high selectivity.

The present invention provides the following technical solution: a preparation method of a copper integrated electrode with a convertible oxidation state, including the following steps:

1) cutting copper foam into strips, and washing with ethanol and acetone to remove surface impurities;

2) drying the copper foam carrier obtained after washing in step 1) at room temperature, and immersing in a graphene oxide solution with a concentration of 0.1 mg/mL-10 mg/mL, after soaking for 1 min-10 min, covering a surface of the copper foam with a carbon layer, transferring to a constant temperature oven, and drying for 1 h-10 h at 50° C.-100° C.;

3) calcining the copper foam carrier obtained in step 2) for 1 h-5 h at 200° C.-500° C. in a tubular furnace with an argon atmosphere to obtain a C—Cu electrode substrate;

4) after cutting the C—Cu electrode substrate obtained in step 3) to a size of 1 cm×1 cm, cleaning 2-3 times with ultrapure water, placing in an alkali solution with a concentration of 0.1 M-1 M, conducting a CV scanning for 1-400 cycles in a voltage range of −1 V-+1 V by cyclic voltammetry, and then cleaning 2-3 times with ultrapure water again and drying to obtain a copper integrated electrode with a covertible oxidation state.

Further, a concentration of a graphene oxide in the graphene oxide solution is 0.1 mg/mL-5 mg/mL.

A preparation method of the graphene oxide solution includes the following steps: M1: adding 2 g of graphite powder with a particle size of 325 mesh into concentrated sulfuric acid containing $K_2S_2O_8$ and $P_2O_5$, after mixing uniformly, heating to 80° C. and keeping a reaction system at 80° C. for reflux and stirring for 5 h, after the reaction is completed, pouring an obtained mixture into 500 mL of pure water, stirring, mixing and putting aside to form a precipitate, filtering through a 0.2 μm filter membrane, washing the filtered precipitate with pure water, and drying in the air to obtain a pre-oxidized graphite;

M2: adding the pre-oxidized graphite obtained in step M1 into 120 mL of concentrated sulfuric acid in an ice bath, slowly adding 25 g of $KMnO_4$ at 4° C.-6° C. under a constant stirring, continuing to stir at 35° C. for 4 h, then slowly adding 250 mL of deionized water and continuing the chemical reaction at a temperature below 50° C.;

M3: adding 1 L of deionized water to the mixture obtained in step M2, then slowly adding 30 mL of hydrogen peroxide solution with a mass fraction of 30% dropwise, fully stirring, after the reaction is completed, washing the precipitate with 1 L of dilute hydrochloric acid with a volume ratio of 1:10 to remove unreacted $KMnO_4$, and then washing with 1 L of deionized water to remove residual dilute hydrochloric acid;

M4: filtering the mixture obtained in step M3 to obtain a graphene oxide solid, dissolving with deionized water to prepare a graphene oxide solution with a mass fraction of 0.5%;

M5: dialyzing continuously the graphene oxide solution obtained in step M4 for 1 week to remove residual metal ion impurities, performing a suction filtration on a solution obtained after dialysis, and preparing obtained solid powder into a graphene oxide solution with a required concentration, then stripping a graphene material in the graphene oxide solution by an ultrasonic method to finally obtain the graphene oxide solution with the required concentration in a uniform light yellow and clear state.

Further, the alkali solution is a NaOH solution.

Further, the voltage range of the cyclic voltammetry in step 4) is −0.5 V-+0.85 V.

The present invention also provides a copper integrated electrode with a convertible oxidation state prepared by the above preparation method, and the electrode is a single metal copper self-supporting $Cu_2O$ nanowires electrode.

The present invention also provides an application method of the copper integrated electrode with the convertible oxidation state in denitrification of a water body containing nitrate. The copper integrated electrode with the convertible oxidation state is used as a working electrode, a platinum electrode is used as a counter electrode, and an Ag/AgCl electrode is used as a reference electrode to form a three-electrode system. The three-electrode system is placed in the water body containing the nitrate for a denitrification treatment.

Further, a concentration of the nitrate in the water body containing the nitrate is 10 mgN/L-300 mgN/L.

Further, a mixed electrolyte of $Na_2SO_4$ and NaCl is used in the three-electrode system.

Further, in the mixed electrolyte of $Na_2SO_4$ and NaCl, a concentration of the $Na_2SO_4$ is 0.06 mol/L-0.2 mol/L, and a concentration of the NaCl is 0.01 mol/L-0.05 mol/L.

Further, an applied voltage of the denitrification treatment is −1.1 V--1.5 V, and a denitrification time is 1 h-28 h.

The advantages of the present invention are as follows.

1. In the process of preparing the copper integrated electrode with the convertible oxidation state of the present invention, the copper foam is immersed firstly in the graphene oxide solution, and dried in the constant temperature oven, annealed at the temperature of 200° C.-500° C., and then treated in the alkali solution. The copper foam substrate is covered with the carbon layer by soaking in the graphene oxide solution, so as to promote electrochemical deposition to prepare the copper integrated electrode with the convertible oxidation state. The carbon coating greatly improves the conductivity and stability of the copper foam substrate, thereby enabling the preparation of the copper integrated electrode with the convertible oxidation state, ensuring two subsequent 100% denitrification and nitrogen selectivity effects.

2. The preparation method of the copper integrated electrode with the convertible oxidation state adopts the non-toxic and cheap transition metal Cu to prepare the electrode to replace the bimetallic nanocatalyst based on the noble metal. The $Cu_2O$ on the surface of the copper integrated electrode with the convertible oxidation state has excellent electron-supply ability and can be used for electrocatalytic reduction of $NO_3^-$ in water. Compared with octahedral and cubic structures, $Cu_2O$ nanowires provide a one-dimensional electronic pathway for fine tuning electron transfer along the axis and rapid strain relaxation driven by electrochemical volume expansion/contraction.

3. The copper integrated electrode with the convertible oxidation state, which is synthesized by the preparation method of the present invention, is used for electrocatalytic reduction from $NO_3^-$ to $N_2$ in a water body containing nitrate. The surface is oxidizable copper (I, II/0, I), oxygen vacancy (O) and a one-dimensional nanowire structure, so that the removal rate of $NO_3^-$ in the water body containing the nitrate is close to 100%, and nearly 100% of the $N_2$ selectivity and the cycle stability of the electrocatalytic reduction of the $NO_3^-$ are achieved.

4. When the copper integrated electrode with the convertible oxidation state prepared by the present invention is applied to denitrification of the water body containing the nitrate, various kinds of free radicals are generated in the solution. These free radicals have strong oxidizability and effectively remove the impurities in sewage. The denitrification is realized under the action of $H_2$ generated by electrolysis during the electrochemical denitrification and the nitrate in sewage. $NO_3$-N is an electron acceptor, and the product is non-toxic and tasteless $N_2$.

5. The present invention not only provides ideas for the development and design of Cu-based green nanomaterials with better performance, but is also expected to solve the problem of difficulty in reaching the standard for total nitrogen emission in a sewage treatment plant. It provides new ideas and scientific basis for the large-scale and practical application of electrochemical nano-denitrification in water purification, wastewater treatment and environmental remediation.

BRIEF DESCRIPTION OF THE DRAWINGS

The present invention will be described in more detail below based on embodiments and drawings, where.

DETAILED DESCRIPTION OF THE EMBODIMENTS

Figure 1:
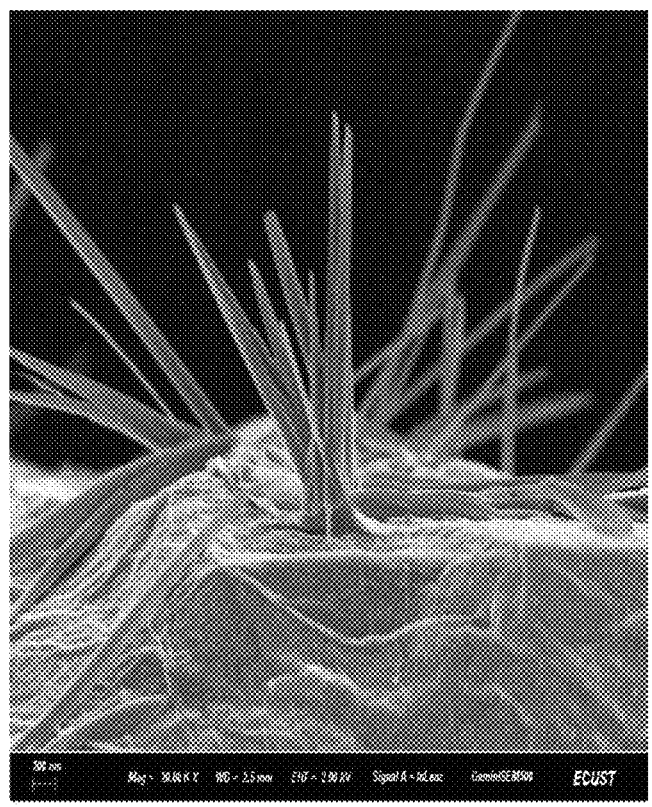
FIG. 1 is a scanning electron microscope (SEM) image of $Cu_2O$ nanowires in embodiment 1 of the present invention.

The technical solutions in the embodiments of the present invention will be clearly and completely described below in combination with the drawings of the embodiments of the present invention, and it will be apparent that the described embodiments are only a part of the embodiments of the present invention, and not all the embodiments. Based on the embodiments of the present invention, all other embodiments obtained by those of ordinary skill in the art without creative labor are within the scope of protection of the present invention.

Embodiment 1

A preparation method of a copper integrated electrode with a convertible oxidation state provided by the present embodiment includes the following steps:

copper foam is cut into strips and washed with ethanol and acetone to remove surface impurities;

the copper foam is soaked in a 1 mg/mL graphene oxide solution for 1 min, placed in a 60° C. oven, dried for 2 h, then taken out and calcined in a tubular furnace at 300° C. for 2 h;

the calcined sample is put in a 0.1 M NaOH solution, and a CV scanning is performed for 200 cycles in a voltage range of −0.2 V-+0.9 V to form a self-supporting $Cu_2O$ nanowires electrode, which is the copper integrated electrode with the convertible oxidation state in the present embodiment.

A preparation method of the graphene oxide solution adopts an improved Hummers-Offeman chemical oxidation method, including the following steps:

M1: 2 g of graphite powder with a particle size of 325 mesh is added into concentrated sulfuric acid containing $K_2S_2O_8$ and $P_2O_5$, mixed uniformly, heated to 80° C. and a reaction system is kept at 80° C. for reflux and stirring for 5 h, after the reaction is completed, an obtained mixture is poured into 500 mL of pure water, stirred, mixed and put aside to form a precipitate, and then the precipitate is filtered through a 0.2 μm filter membrane, the precipitate obtained by filtration is washed with pure water, and dried in the air to obtain a pre-oxidized graphite;

M2: the pre-oxidized graphite obtained in step M1 is added into 120 mL of concentrated sulfuric acid in a state of ice bath, 25 g of $KMnO_4$ is slowly added at 4° C.-6° C. with constant stirring, and stirred continuously at 35° C. for 4 h, then 250 mL of deionized water is slowly added and the chemical reaction is continued at a temperature below 50° C.;

M3: 1 L of deionized water is added to the mixture obtained in step M2, then 30 mL of hydrogen peroxide solution with a mass fraction of 30% is slowly and dropwise added, after the reaction is completed under full stirring, the precipitate is washed with 1 L of dilute hydrochloric acid with a volume ratio of 1:10 to remove unreacted $KMnO_4$, and then washed with 1 L of deionized water to remove residual dilute hydrochloric acid;

M4: the mixture obtained in step M3 is filtered to obtain a graphene oxide solid, the graphene oxide solid is dissolved with deionized water to prepare a graphene oxide solution with a mass fraction of 0.5%;

M5: the graphene oxide solution obtained in step M4 is dialyzed continuously for 1 week to remove residual metal ion impurities, a solution obtained after dialysis is subjected to a suction filtration, and obtained solid powder is prepared into a graphene oxide solution with a concentration of 1 mg/mL, then a graphene material in the graphene oxide solution is stripped by an ultrasonic method to finally obtain the graphene oxide solution with the concentration of 1 mg/mL in a uniform light yellow and clear state.

The present embodiment also provides an application method of applying the self-supporting $Cu_2O$ nanowires electrode to electrocatalytic denitrification in a water body containing nitrate. The self-supporting $Cu_2O$ nanowires electrode obtained above is directly used as a working electrode, a platinum electrode is used as a counter electrode, and an Ag/AgCl electrode is used as a reference electrode to form a three-electrode system. The three-electrode system is placed in the water body containing the nitrate for a denitrification treatment.

A concentration of the nitrate in the water body containing the nitrate is 100 mgN/L. In the mixed electrolyte of $Na_2SO_4$ and NaCl, a concentration of the $Na_2SO_4$ is 0.1 mol/L, and a concentration of the NaCl is 0.02 mol/L. An applied voltage is −1.3 V, and a denitrification time is 18 h.

FIG. 1 shows that $Cu_2O$ nanowires have a one-dimensional nanowire structure, which provides a high specific surface area.

Figure 2:
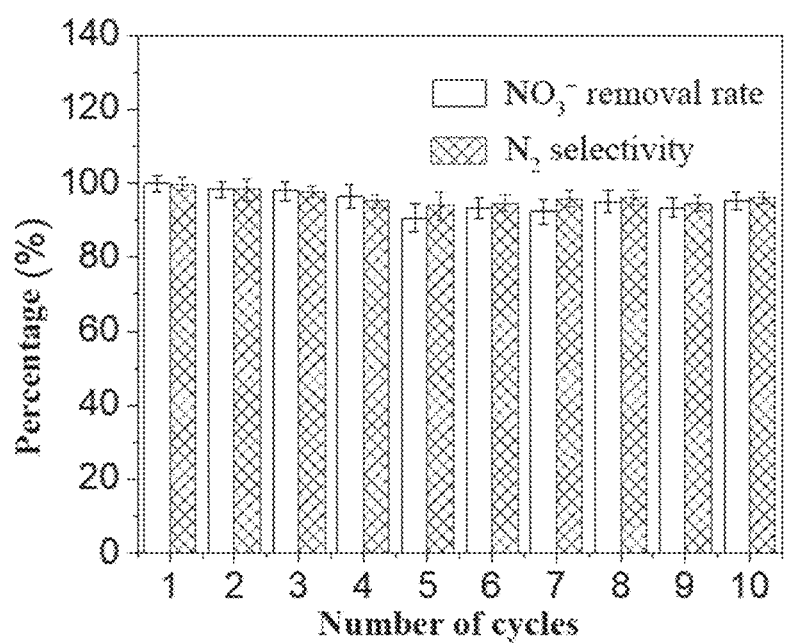
FIG. 2 is a diagram showing the cyclic stability of the $Cu_2O$ nanowires for nitrate removal and nitrogen selectivity in embodiment 1 of the present invention.

FIG. 2 shows that after 10 consecutive cycles of electrocatalytic denitrification, the rate constant of nitrate nitrogen remains unchanged, while the removal capacity of nitrate decreases slightly, indicating that the catalyst can maintain good reaction power and cycling stability.

Electrochemical treatment technology refers to a series of physical and chemical reactions occur in a specialized reaction vessel with the assistance of electrode or external electric field, so as to realize the degradation effect on wastewater pollutants. Electrochemical treatment process does not need to add any pharmaceutical reagents, and it will not pollute the environment, so it is called "environment-friendly" technology. When the copper integrated electrode with the convertible oxidation state provided by the present invention is used for electrochemical denitrification in the water body containing the nitrate, various kinds of free radicals are generated in the solution. These free radicals have strong oxidizability and effectively remove the impurities in sewage. The denitrification is realized under the action of $H_2$ generated by electrolysis during the electrochemical denitrification and the nitrate in sewage. $NO_3$-N is an electron acceptor, and the product is non-toxic and tasteless $N_2$.

When the nitrate ions in the aqueous solution are adsorbed on the surface of the copper integrated electrode with the convertible oxidation state, the nitrate in the water passes through the surface of the electrode, with 2 electrons transferring firstly to form $NO_3^{2-}$, then 1 electron transferring to form NO, and finally 2 electrons transferring through the copper integrated electrode to form $N_2$. A total of 5 electrons are transferred during the process of converting nitrate in the water body into $N_2$, and the selective reduction and denitrification treatment of the nitrate in the water body is achieved by the copper integrated electrode with the convertible oxidation state, which is environmentally friendly and does not need to add other additives. Moreover, the raw materials for electrode preparation are cheap and easy to obtain, the preparation process is simple, and the denitrification efficiency is remarkable.

Embodiment 2

The difference between the present embodiment and embodiment 1 is that in a preparation method of a copper integrated electrode with a convertible oxidation state of the present embodiment, a CV scanning is performed for 100 cycles.

Figure 3:
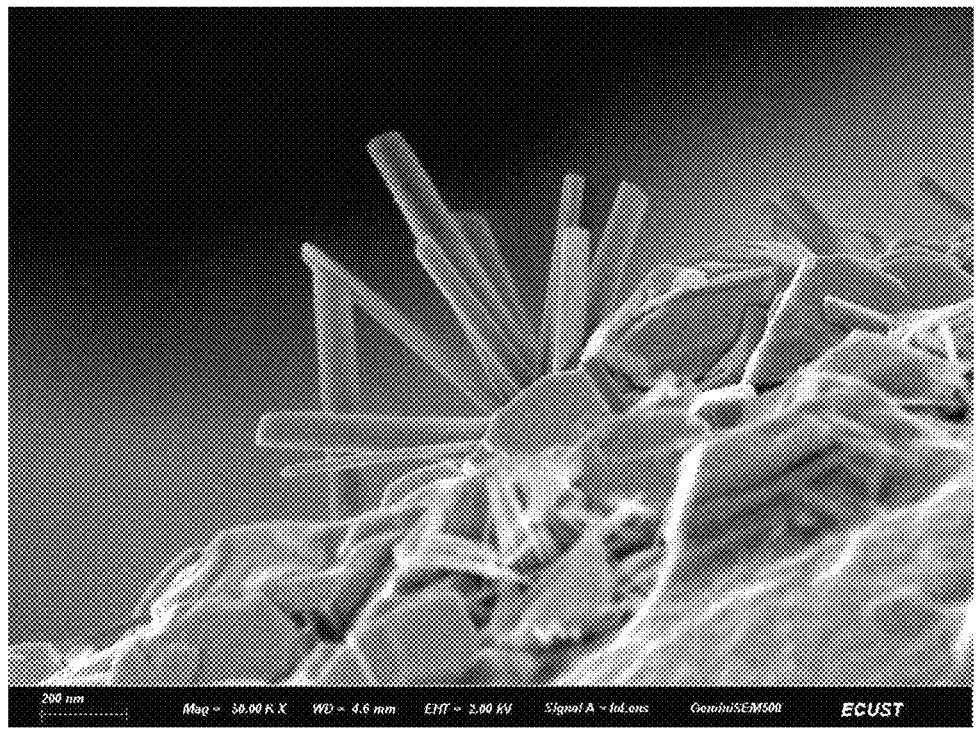
FIG. 3 is an SEM image of $Cu_2O$ nanowires-100 in embodiment 2 of the present invention.

FIG. 3 shows that the obtained electrode $Cu_2O$ nanowires-100 cycles maintains a nanowire structure, but lengths of the $Cu_2O$ nanowires are shorter than lengths of the $Cu_2O$ nanowires in embodiment 1.

Embodiment 3

The difference between the present embodiment and embodiment 1 is that the CV scanning is not performed in a preparation method of a copper integrated electrode with a convertible oxidation state of the present embodiment.

Figure 4:
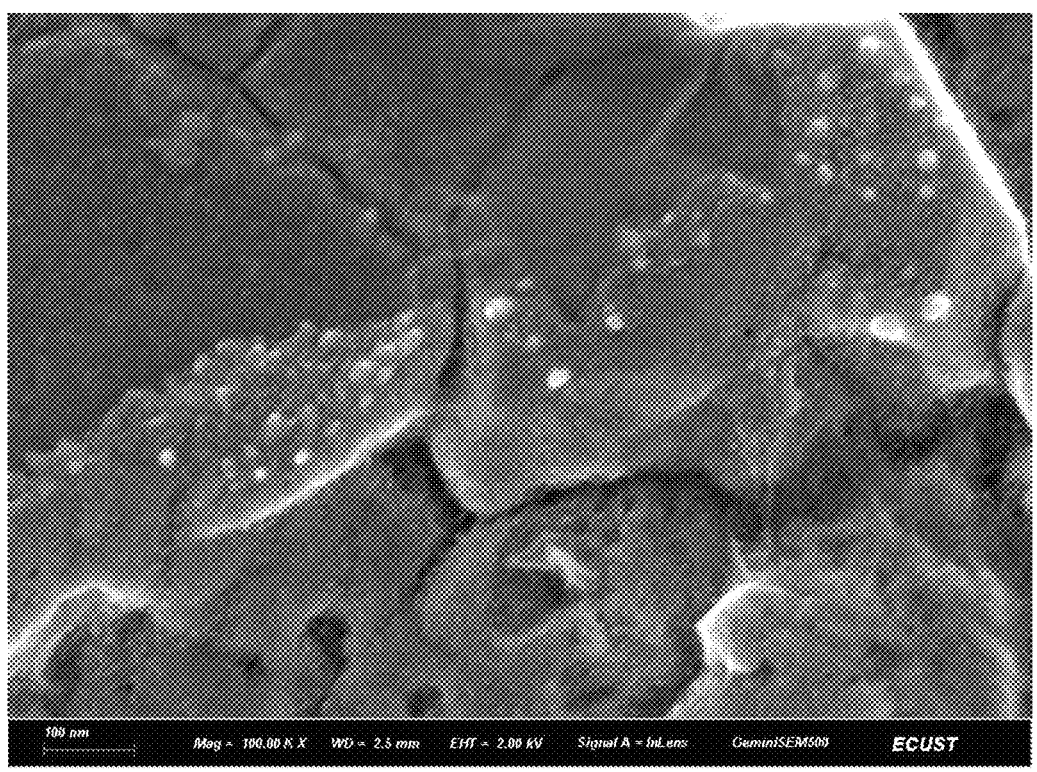
FIG. 4 is an SEM image of $Cu_2O$ nanocrystals in embodiment 3 of the present invention.

FIG. 4 shows that only the nanocrystals are formed in the obtained electrode $Cu_2O$ nanowires, which provides guidance for the subsequent directional growth of the nanowires.

Embodiment 4

The difference between the present embodiment and embodiment 1 is that in a preparation method of a copper integrated electrode with a convertible oxidation state of the present embodiment, the obtained $Cu_2O$ nanowires are firstly acid washed with acetic acid, and then an electrochemical CV scanning is performed on the $Cu_2O$ nanowires for 200 cycles.

Figure 5:
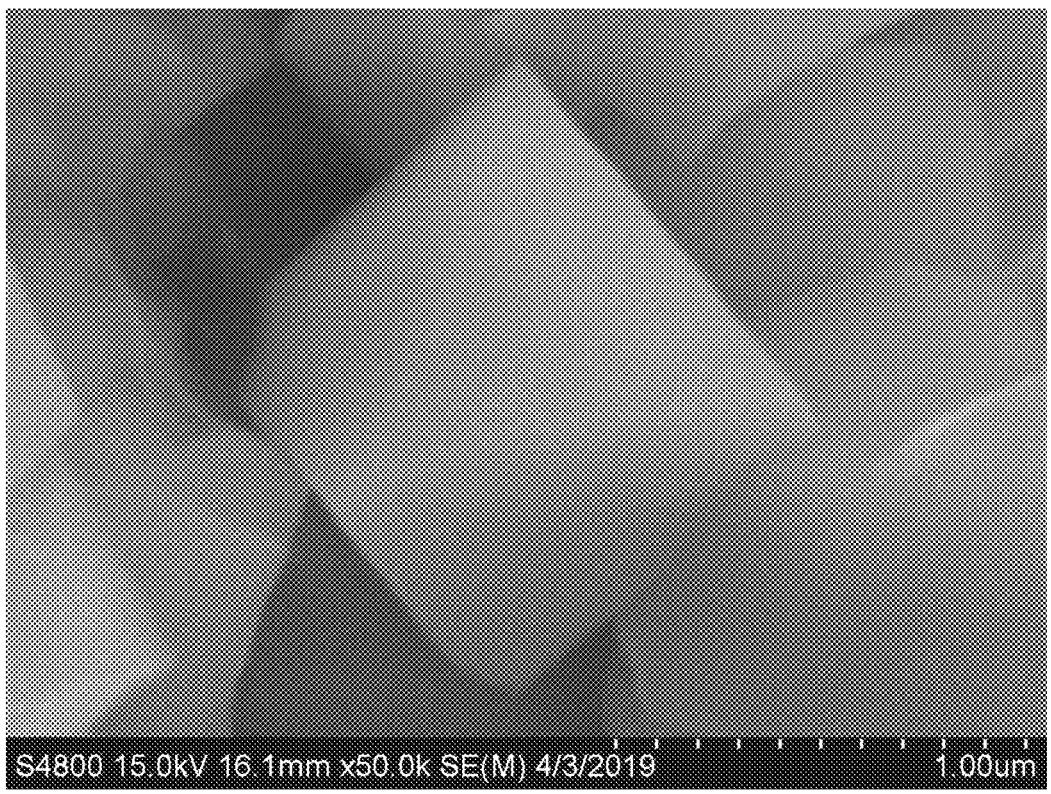
FIG. 5 is an SEM image of $Cu_2O$ octahedrons in embodiment 4 of the present invention.

FIG. 5 shows that the obtained electrode $Cu_2O$ nanowires are $Cu_2O$ octahedrons.

Embodiment 5

The difference between the present embodiment and embodiment 1 is that in a preparation method of a copper integrated electrode with a convertible oxidation state of the present embodiment, the obtained $Cu_2O$ nanowires are firstly acid washed with hydrochloric acid, and then an electrochemical CV scanning is performed on the $Cu_2O$ nanowires for 200 cycles.

Figure 6:
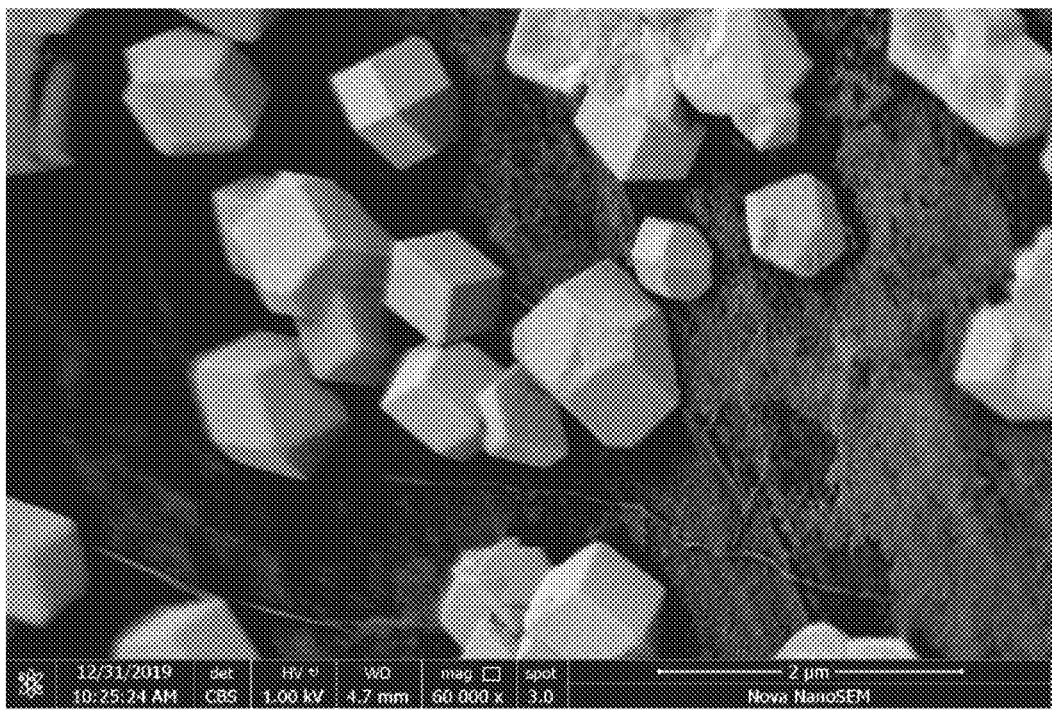
FIG. 6 is an SEM image of $Cu_2O$ cubes in embodiment 5 of the present invention.

FIG. 6 shows that the surface of the obtained electrode $Cu_2O$ nanowires is $Cu_2O$ cube morphology.

Figure 7:
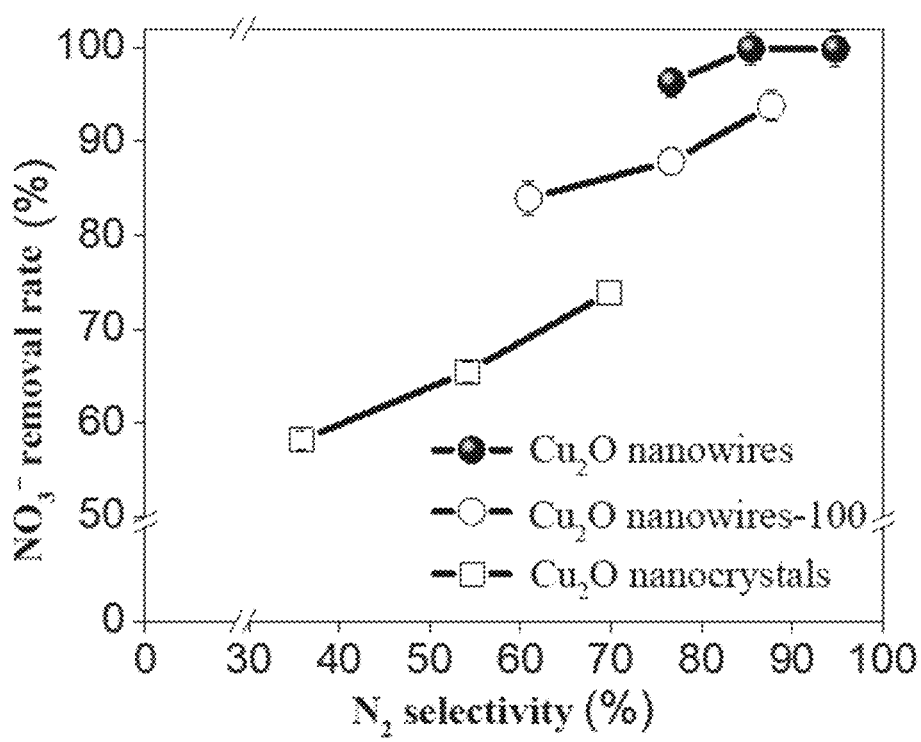
FIG. 7 is a diagram showing the nitrate removal rates and the nitrogen selectivities of the $Cu_2O$ nanowires obtained by embodiment 1, the $Cu_2O$ nanowires-100 obtained by embodiment 2 and the $Cu_2O$ nanocrystals obtained by embodiment 3 of the present invention.

FIG. 7 shows that compared with the $Cu_2O$ nanowires-100 and the $Cu_2O$ nanocrystals, the obtained electrode $Cu_2O$ nanowires have higher nitrate removal rate and nitrogen selectivity.

Figure 8:
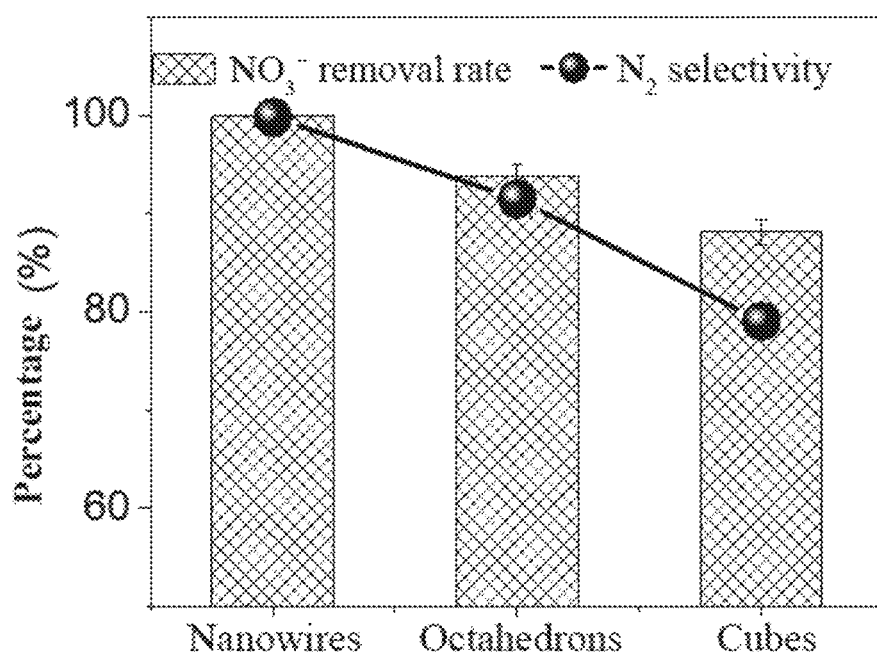
FIG. 8 is a diagram showing the nitrate (with different concentrations) removal rates and the nitrogen selectivities of the $Cu_2O$ nanowires obtained by embodiment 1, the $Cu_2O$ octahedrons obtained by embodiment 4 and the $Cu_2O$ cubes obtained by embodiment 5 of the present invention.

FIG. 8 shows that compared with the $Cu_2O$ octahedrons and the $Cu_2O$ cubes, the obtained electrode $Cu_2O$ nanowires have higher nitrate removal rate and nitrogen selectivity.

Embodiment 6

The difference between the present embodiment and embodiment 1 is that in a preparation method of the present embodiment, the copper foam is soaked in a 0.1 mg/mL graphene oxide solution for 5 min, placed in a 50° C. oven, dried for 1 h, then taken out and calcined in a tubular furnace at 200° C. for 5 h;

the calcined sample is put in a 0.5 M NaOH solution, and a CV scanning is performed for 1 cycle in a voltage range of −1 V-+1 V.

When the copper integrated electrode obtained in the present embodiment used as the working electrode is applied in the water body containing the nitrate for a denitrification treatment, a concentration of the nitrate in the water body containing the nitrate is 200 mgN/L; in the mixed electrolyte of $Na_2SO_4$ and NaCl, a concentration of the $Na_2SO_4$ is 0.06 mol/L, and a concentration of the NaCl is 0.05 mol/L; an applied voltage is −1.1 V, and a denitrification time is 28 h.

Embodiment 7

The difference between the present embodiment and embodiment 1 is that in a preparation method of the present embodiment, the copper foam is soaked in a 10 mg/mL graphene oxide solution for 10 min, placed in a 100° C. oven, dried for 10 h, then taken out and calcined in a tubular furnace at 500° C. for 1 h;

the calcined sample is put in a 0.5 M NaOH solution, and a CV scanning is performed for 400 cycles in a voltage range of −0.5 V-+0.85 V.

When the copper integrated electrode obtained in the present embodiment used as the working electrode is applied in the water body containing the nitrate for a denitrification treatment, a concentration of the nitrate in the water body containing the nitrate is 300 mgN/L; in the mixed electrolyte of $Na_2SO_4$ and NaCl, a concentration of the $Na_2SO_4$ is 0.2 mol/L, and a concentration of the NaCl is 0.01 mol/L; an applied voltage is −1.5 V, and a denitrification time is 1 h.

Embodiment 8

The difference between the present embodiment and embodiment 1 is that in a preparation method of the present embodiment, the copper foam is soaked in a 5 mg/mL graphene oxide solution.

The above description of the embodiments is to facilitate the understanding and application of the present invention by those skilled in the art. Those skilled in the art can easily make various modifications to these embodiments and apply the general principles described herein to other embodiments without creative labor. Therefore, the present invention is not limited to the embodiments here, and the improvements and modifications made by those skilled in the art without departing from the scope of the present invention according to the disclosure of the present invention shall be within the scope of protection of the present invention.

What is claimed is:

1. An application method of the copper integrated electrode with the convertible oxidation state, wherein the copper integrated electrode is a single metal copper self-supporting Cu2O nanowires electrode in a denitrification treatment of a water body containing nitrate, comprising:
   forming a three-electrode system using the copper integrated electrode with the convertible oxidation state as a working electrode, a platinum electrode as a counter electrode, and an Ag/AgCl electrode as a reference electrode; and
   placing the three-electrode system in the water body containing e for the denitrification treatment;
   wherein a mixed electrolyte of Na2SO4 and NaCl is used in the three-electrode system and in the mixed electrolyte of the Na2SO4 and the NaCl, a concentration of the Na2SO4 is 0.06 mol/L-0.2 mol/L, and a concentration of the NaCl is 0.01 mot/L-0.05 mol/L.

2. The application method according to claim 1, wherein a concentration of the nitrate in the water body containing the nitrate is 10 mgN/L-300 mgN/L.

3. The application method according to claim 1, wherein an applied voltage of the denitrification treatment is −1.1 V--1.5 V, and a denitrification tune is 1 h-28 h.

* * * * *